United States Patent
Hanna et al.

(10) Patent No.: US 9,061,936 B2
(45) Date of Patent: Jun. 23, 2015

(54) SYSTEMS FOR FIBERIZING MOLTEN GLASS

(75) Inventors: Terry Joe Hanna, Millersport, OH (US); Thomas Kent Thompson, Granville, OH (US); Russell Donovan Arterburn, Athens, TN (US)

(73) Assignee: Johns Manville, Denver, CO (US)

( * ) Notice: Subject to any disclaimer, the term of this patent is extended or adjusted under 35 U.S.C. 154(b) by 935 days.

(21) Appl. No.: 12/711,380

(22) Filed: Feb. 24, 2010

(65) Prior Publication Data

US 2010/0147033 A1  Jun. 17, 2010

Related U.S. Application Data

(62) Division of application No. 11/328,703, filed on Jan. 10, 2006, now Pat. No. 7,694,535.

(51) Int. Cl.
*C03B 37/02* (2006.01)
*C03B 37/07* (2006.01)

(52) U.S. Cl.
CPC ......... *C03B 37/0206* (2013.01); *C03B 37/0213* (2013.01); *C03B 37/0216* (2013.01); *C03B 37/0209* (2013.01)

(58) Field of Classification Search
CPC ............ C03B 37/0206; C03B 37/0209; C03B 37/0213; C03B 37/0216
See application file for complete search history.

(56) References Cited

U.S. PATENT DOCUMENTS

| | | | |
|---|---|---|---|
| 2,335,135 A | 11/1943 | Staelin | |
| 3,294,503 A | 12/1966 | Machlan et al. | |
| 3,905,790 A | 9/1975 | Strickland | |
| 4,141,709 A * | 2/1979 | Reese | 65/478 |
| 4,222,757 A | 9/1980 | Glaser et al. | |
| 4,229,198 A | 10/1980 | Coggin, Jr. et al. | |
| 4,270,942 A * | 6/1981 | Coggin et al. | 65/537 |
| 4,311,500 A | 1/1982 | Roberson et al. | |
| 4,321,074 A | 3/1982 | Glaser et al. | |
| 4,343,635 A | 8/1982 | Kim et al. | |
| 4,349,364 A | 9/1982 | Morrison | |
| 4,362,541 A * | 12/1982 | Thompson | 65/478 |
| 4,379,713 A | 4/1983 | Eisenberg | |
| 4,397,665 A | 8/1983 | Harris | |
| 4,482,370 A | 11/1984 | Eisenberg | |
| 4,488,891 A | 12/1984 | Grubka et al. | |
| 4,662,922 A | 5/1987 | Hill et al. | |
| 5,955,011 A * | 9/1999 | Clocksin et al. | 264/6 |
| 2001/0011466 A1* | 8/2001 | Arterburn et al. | 65/480 |
| 2002/0129624 A1* | 9/2002 | Gao et al. | 65/430 |

* cited by examiner

*Primary Examiner* — Jodi C Franklin
(74) *Attorney, Agent, or Firm* — Robert D. Touslee

(57) ABSTRACT

Methods for substantially improving the stability of a melting furnace system including bushings and cooling apparatus for converting molten mineral material to continuous fibers is disclosed. Apparatus and methods for maintaining the molten material throughput and the electrical power load on fiberizing bushings substantially constant are disclosed. The orifice plate, with or without tips or nozzles, is subjected to a more rapid rate of heat removal after the bushing breaks out than it did while the bushing was in a desired fiberizing mode. Apparatus for blowing cooling air upward onto the orifice plate during the time the bushing is breaking out and/or hanging to provide additional cooling is disclosed along with optional additional or alternative apparatus to use for optional additional or alternative cooling is also disclosed.

4 Claims, 8 Drawing Sheets

SYSTEMS FOR FIBERIZING MOLTEN GLASS

This application is a division of application Ser. No. 11/328,703, filed Jan. 10, 2006. The invention involves an improved method of making fiber from molten glass including blowing cooling gas upward onto an orifice plate of a bushing when the bushing stops fiberizing in the desired manner, i.e. one or more fibers breaks causing others to break until all the fibers have broken, sometimes also called a break out, to maintain the molten glass throughput from the bushing. More particularly, the present invention involves methods for making fiber that provide a more uniform temperature profile across the orifice/tip plate of the bushings and a better molten material temperature control capability for the melting furnace, forehearth(s), bushing legs and the bushings.

BACKGROUND

In the manufacture of fiber from molten material, it has been common practice to use electrically heated bushings made of precious metals including platinum, rhodium, palladium, ruthenium, iridium and alloys thereof. The bushings are electrically heated by their own resistance and are usually box-like, open on the top and comprise an orifice plate containing hundreds or thousands of orifices, with or without nozzles or tips welded or formed thereon, as shown by U.S. Pat. Nos. 4,207,086 and 4,078,413, which disclosures are hereby incorporated by reference.

As the molten material emerges from the orifices or tips, a meniscus or cone of molten material is formed below each orifice or tip from which a fiber is pulled continuously. This is the objective, but if the fiberizing quality of the glass reaching the bushing, and particularly the orifice plate or tip plate, i.e. the temperature of each meniscus is not within the fiberization range, or the molten glass contains small stones, other inclusions or chords, one or more fibers will break, requiring a costly stoppage of desired fiberization from that bushing and a beading down and restart to achieve the desired fiberization. By desired fiberization is meant that the bushing is operating making the desired fiber for the product being produced. To remove the heat from the meniscus and fiber that must be removed to cool the molten or plastic fiber so that it will have integrity and strength to endure the remainder of the process of making the fiber product, cooling members are located close to the orifices or nozzle tips. These cooling members can be either cooling tubes like shown in U.S. Pat. Nos. 4,397,665, 5,244,483 and 6,196,029, the disclosures of which are hereby incorporated by reference, or cooling fins as are well known in the fiber industry.

Occasionally, and sometimes frequently, a fiber will break beneath the bushing for various reasons that are known. When a fiber break occurs, the loose fiber soon causes other fibers to break and soon all, or most, fibers being formed beneath the bushing are broken, a stoppage of desired fiberization. This is called a "breakout" in the industry. After a breakout begins, it is necessary to wait a short time, usually tens of seconds up to a few minutes, for beads of molten glass to form beneath each bushing orifice or tip, and become large enough that they break loose and fall from the bottom of the orifice plate or tip pulling a very coarse fiber, called a primary fiber, onto the floor, into a scrap bin, basement or scrap bin beneath the forming room floor. This is normally called "beading out" in the industry. Once beaded out, or as soon as the operator is available, the operator or starting equipment can then restart a strand containing the primary fibers into a chopper or winder and again begin making the desired product. Detectors for detecting when a breakout is occurring are known as evidenced by U.S. Pat. Nos. 4,130,406, 4,229,198, 4,342,579, 3,432,580, 4,401,452, and 4,925,471.

When the bushing is running good product the fibers are moving away from the bottom of the bushing at a speed of thousands of feet per minute. This downward movement at this speed, of an array of hundreds or thousands of fibers, creates, due to friction between the air surrounding the fibers and the surface of the fibers, a partial vacuum (lower pressure zone) by pulling a stream of air downward. The partial vacuum causes a flow of cooling air from the surroundings into the array close to the orifice plate and tips of the bushing. This flow of inspirated air coming from outside the array of fibers cools the tips, meniscuses and the newly formed fibers. The cooling of the bushing, tips and orifice plate, causes additional electrical power to be applied to the bushing automatically to maintain the set-point temperature.

When the bushing breaks out, this inspirated cooling flow of cooling air stops. At that time several more undesirable things begin. The set point thermocouple begins to heat up because of the loss of cooling air and as it does, the controller decreases the electrical power heating the bushing. As the electrical power is decreased during the beading out and hanging periods, the molten glass through-put decreases by 5-15 percent, slowing the flow of molten glass through the well, orifice, between the forehearth leg above the bushing and the bushing causing the temperature of the molten glass in the well, and thus the molten glass entering the bushing, to drop substantially, about 25-75 degrees F. This colder glass coming into the bushing causes the molten glass exiting the orifices to be colder and thus to have a higher viscosity. The higher viscosity glass has more resistance to attenuation when desired fiberization is begun, causing higher stress in the fiber at its weakest point, and it frequently breaks. This is why the break rate is normally highest during the first ten minutes or longer after restart of desired fiberization, particularly as the area of the orifice/tip plate of the bushings has increased to accommodate mote orifices/tips. The larger the area of the orifice plate or tip plate, the greater the tendency to have a larger temperature variance across the orifice plate or tip plate or the tips. It normally takes about ten minutes or longer for the molten glass in, and exiting, the bushing to again reach the desired fiberizing temperature.

The above conditions apply to any molten material and are most costly in the manufacture of so-called "continuous" glass fiber products from molten glass. This condition has been addressed in the past by the use one or more air tubes below an electrically heated bushing to run continuously or intermittently to cause a cooling air stream to be inspirated into the bushing tips, the array of newly formed fibers, beads, or primary fibers below the tips even after the bushing has broken out. This is disclosed in U.S. Pat. No. 4,662,922. This improved the break rate, but is not sufficient, particularly on large bushings having one or two thousand or more tips, to prevent the problems described above.

It is also known in electrically heated flat plate bushings having no tips or nozzles such as disclosed in U.S. Pat. Nos. 3,905,790 and 4,229,198, but only orifices or slightly raised lands around one or a few orifices, to blow cooling air upward onto the orifice plate during fiberizing, beading out and hanging modes, i.e. producing primary fibers, not a desired fiber product. However, flat plate bushings have proven to be costly to operate and are to date are only practical for making coarse fibers having a diameter of 19 or more microns. Attempts to operate a tip type bushings having cooling members mounted beneath the orifice plate using the upward air flow like that used on flat plate bushings have proven to be deleterious to good fiberizing efficiency. But it is known to use upward air flow cooling to try to replace conventional cooling members like cooling fins and or cooling tubes normally mounted beneath the orifice plate of a bushing as disclosed in U.S. Pat. Nos. 4,321,074 and 4,362,541, but these must not have proved successful because the glass fiber industry still uses cooling tubes and cooling fins beneath the bushing.

In the manufacture of continuous glass fibers, melting furnaces are typically used to melt batch, refine the molten glass, and to feed molten glass through one or more forehearths and usually a plurality of bushing legs to the bushings. It is extremely important, to achieve a very low break rate, bushing breakout rate, that the molten glass coming to the bushings is fully melted and uniform in temperature and chemistry. Mixing in the molten glass is mainly dependent upon maintaining desired temperature gradients in the melting furnace. There are typically hundreds of thousands of pounds of molten glass, often about 500,000 pounds, in a typical melting furnace system for making continuous glass fibers. With this much molten material, the melting furnace and delivery system has great momentum and inertia, i.e. it is difficult and takes considerable time correct a change in the molten glass reaching the bushings following a furnace upset. A furnace upset is anything that makes a significant change in the way the melting furnace is operating, including a significant change in the throughput of molten glass through the delivery system, including the bushings. In the past it has been noticed that when a plurality of bushings were stopped from making desired fiber product and put into a hanging mode, to permit a chopper that had been pulling strands of fibers from the bushings to be rebuilt, that after a few minutes the conditions inside the melting furnace would change and that the automatic burner controls for the melter were changing conditions of the burners responding to the change(s) in the furnace. This is necessary, but not desirable. Although improvements in melting furnace control and stability have been made through the decades that large melting furnaces have existed, frequent furnace upsets or disturbances still exist result in lower productivity and higher manufacturing costs.

SUMMARY

It has been discovered that if enough additional cooling is applied upon, or soon after, a bushing breakout to maintain substantially the same molten material throughput of the bushing during a breakout, bead out and a period of hanging mode as the throughput when the bushing is in a desired fiberization mode, the break rate of the bushing in the first 10-20 minutes, particularly in the first 10 minutes following a restart of desired fiberization from the hanging mode, is substantially decreased. By substantially constant means within about 96 to about 103 percent of the molten material throughput during desired fiberization, the latter throughput being the throughput after 20 minutes of desired fiberization. More typically the throughput of molten material through the bushing during interruptions of desired fiberization is maintained to within about 97 to 102 percent of desired fiberization throughput, most typically within about 98 to about 102 percent.

It has also been discovered that when the above has been achieved the magnitude of the electrical power load on the electrically heated bushing also remains substantially the same during the hanging mode period as the throughput during desired fiberization periods. By substantially the same is meant that the electrical power load on the bushing remains within the range of about +/−1 percent during the periods of desired fiberization, breakout, bead out, hanging mode and desired fiberization. More typically, the electrical power load on the bushing remains within about +/−0.5 percent, and most typically about +/−0.25 percent variation.

From the above discoveries, it is believed that if the throughput on at least many of the bushings on a melting furnace system, including a plurality of bushings and a melting furnace supplying molten material to the bushings, is maintained substantially constant, the stability of the melting furnace will be substantially improved and the fiberizing quality of the molten material flowing into the bushings will be substantially improved. By many of the bushings is meant at least about 25 percent of the operating bushings in the system. When most of the bushings are operated according to the invention, the melting furnace will operate at substantially constant throughput. By most of the bushings is meant at least about 65 percent of the operating bushings in the system. When substantially all of the bushings are operated according to the invention, the throughput of the melting furnace will not vary by more than 1-2 percent, except for power failures or other external interruptions. By substantially all of the bushings is meant at least about 95 percent of the operating bushings in the system.

According to the invention, the amount of cooling of the tip plate or orifice plate is substantially increased beginning soon after the beginning of a breakout, the increased cooling being sufficient to cause the set point thermocouple for the bushing to cause the electrical power to remain substantially the same during the breakout, bead out, hanging period and restart of the desired fiberization of the bushing as the power load on the bushing during desired fiberization. By very soon means within several minutes after the beginning of a breakout, typically before 5-7 minutes have expired, more typically within 3 minutes and most typically within two minutes or less. This can be achieved by using any of several conventional breakout detectors available to activate the additional cooling apparatus.

The invention also includes a process of making fiber from a molten mineral or glass material by flowing the molten material into a fiberizing bushing comprising an orifice plate or tip plate having a plurality of holes therein, with or without tips, nozzles, each tip having an orifice therethrough that communicates through the orifice plate with the molten glass in the bushing, applying electrical power to the bushing causing the molten material to flow through the orifices in the orifice plate or in the tips to form fibers, cooling the just formed fibers using a plurality of cooling members held in place below and spaced from the orifice plate or tip plate a produce a desired fiberization mode, the improvement comprising, after the beginning of a bushing breakout until near the time the bushing is once again in a desired fiberization mode, applying additional cooling to the orifice plate or tip plate of the bushing to maintain the throughput of molten material from the bushing substantially constant. By near the time is meant within 0-4 minutes, more typically within 1-4 minutes, still more typically in less than 2 or 3 minutes on either side of the restart of desired fiberization and most typically within about 90 seconds and more typically within about 45 seconds, before or after, the bushing is once again fiberizing.

The invention also includes a process of making fiber from a molten mineral or glass material by flowing the molten material from a melting furnace through one or more forehearths and bushing legs into a plurality of fiberizing bushings, each bushing comprising an orifice plate or tip plate having a plurality of holes therein, with or without tips, nozzles, each tip having an orifice therethrough that communicates through the orifice plate or tip plate with the molten glass in the bushing, applying electrical power to each of the plurality of bushings causing the molten material to flow through the orifices in the orifice plate or in the tips to form fibers, cooling the just formed fibers using a plurality of cooling members held in place below and spaced from each orifice plate or tip plate a produce a desired fiberization mode, the improvement comprising, after the beginning of a bushing breakout in any of at least many of the plurality of bushings, only until near the time the bushing is once again in a desired fiberization mode, applying additional cooling to the orifice plate or tip plate of the bushing to maintain the throughput of molten material from each of the many bushings substantially constant.

The invention also comprises a method for fiberizing a molten glass with one or more bushings, each bushing having an orifice plate containing a plurality of orifices or a tip plate comprising a plurality of tips, nozzles, protruding from the bottom surface of the orifice plate, through which molten glass flows to form fibers, a controller for providing variable amounts of electrical power to the bushing depending on a signal indicating temperature in or near some part of the bushing, a temperature sensor and cooling members mounted beneath the orifice plate for cooling the molten glass as it exits the nozzles or tips on the orifice plate, causing molten glass to flow into the bushing, heating the bushing with electrical power such that molten glass flows from the tips to form a cone of molten glass beneath each operating tip, pulling a fiber from the bottom of each cone while removing heat from the orifice plate, tips, cones and fibers with the cooling members and, after the bushing begins to break out, starting at least one flow of rapidly moving gas from at least one air tube having a slot or a plurality of orifices in its lower portion to induce lateral air flow into a zone beneath the orifice plate, the one or more air tubes being mounted beneath the orifice plate, the improvement comprising very soon after the bushing has started to break out, directing streams of upward moving cooling gas towards the orifice plate or the tip plate from one or more locations below, and on each side of, the bushing and from outside the path of the array of fibers, beads and primary fibers produced by the bushing, the velocity, temperature and flow rate of the air flow being sufficient to keep the molten material throughput of the bushing within at least 97-103 percent of the molten material throughput during desired fiberization, turning off, or substantially turning off, this upward flow of cooling air near the time that the bushing is again put into a desired fiberizing mode and leaving this upward flow of cooling air turned off, or substantially turned off, until after the bushing again begins to break out. By "substantially turning off" is meant maintaining enough velocity of all of the streams of cooling gas to keep the holes, nozzles, slots or jets emitting the streams from plugging up, but insufficient velocity to reach the cooling members, orifice plate, or tip plate. More typically the cooling is provided by at least two manifolds, one located below and on each side of the orifice plate or tip plate, but out of the path of the product fibers, beads and primary fibers.

By "desired fiberizing or desired fiberization" is meant the condition where fibers are being pulled from a bushing at a speed similar to that produced by a product-forming machine like a chopper or winder, usually at more than 1000 feet per minute. By beading out or breaking out is meant the mode from the time the first fiber breaks out, or from the time the operator or sensor senses that one or more fibers have broken out, until every operable tip has formed a bead of molten glass at the end of the tip, usually so heavy enough that it has fallen away from the tip to form a primary fiber. If one or more tips of the bushing are cold, i.e. cooler than the other tips, for some reason, those few tips will bead very slowly and need not be running a primary fiber for the bushing to be in the hanging mode. By "hanging" is meant a condition or mode where the fibers from the bushing have broken out and the bushing is in the mode where all or almost all of the operating tips are producing coarse, primary fibers and those primary fibers are moving downward due to their own weight, or are being pulled slowly by pull rolls, usually into a waste collection system or waste hopper. Thereafter, until the desired fiberization is restarted, i.e. all or most of the primary fibers from the bushing are inserted into a high-speed pulling device like a winder or a chopper, the bushing remains in a hanging mode.

The invention also includes an optional additional method step of moving the cooling members quickly generally vertically upward a distance of about 0.01 to about 0.2 inch to increase cooling of the orifice plate during hanging and then moving the cooling members downward into an operating position near the time when the bushing has been put in a desired fiberizing mode. By generally vertically is meant vertically and within 5 degrees of vertical.

The invention also includes a further optional additional method step of, following a breakout, activating one or more misters and/or foggers spaced from adjacent each outer row of tips to produce a flow of mist and/or fog towards the tips or a bottom of the orifice plate, and then deactivating the misters and/or foggers near the time when the bushing is once again in a desired fiberizing mode.

The various methods described above can be combined in any combination to achieve the stated objective and to optimize the operating, desired fiberization, efficiency of the bushing and also the adjoining bushing(s).

The invention also includes a system comprising a bushing for making fibers from molten glass, the bushing comprising at least one sidewall and an orifice plate having nozzles or tips protruding from the bottom surface, and cooling members mounted beneath the bushing and close to the bottom of the tips for providing cooling for the molten glass as it exits the tips, the orifice plate or tip plate during fiberizing and hanging modes, the improvement comprising a manifold comprising a nozzle or plurality of nozzles, jets or holes and connected to a source of cooling gas, most typically such a connection at each end of the manifold, or such a connection in the center portion of the manifold, said nozzle, plurality of nozzles, jets or holes being located at least 9-36 inches below the level of the orifice plate or tip plate and on each side of the orifice plate or tip plate, but out of the path of the array of fibers, beads, and primary fibers coming from the bushing. The manifolds are more typically located about 10-24 inches, most typically about 11-18 inches below the orifice or tip plate.

The invention also includes a system comprising a bushing for making fibers from molten glass, the bushing comprising at least one sidewall and an orifice plate having nozzles or tips protruding from the bottom surface, and cooling members mounted beneath and close to the bottom of the tips for providing cooling for the molten glass as it exits the tips, the orifice plate and the tips during fiberizing and hanging modes, the improvement comprising a nozzle or plurality of nozzles, supplied by a manifold connected to a source of cooling gas at each end of the nozzle or manifold, the nozzle or manifold being located at least 10 to about 36 inches below the level of the orifice or tip plate and on each side of the orifice plate, but out of the path of fibers, beads, and primary fibers coming from the bushing and at least one actuator for moving the cooling members quickly from a fiberizing position in an upward direction to a hanging position and for moving the cooling members quickly back downwardly to a fiberizing position, a distance in the range of about 0.01 inch to about 0.2 inch.

The invention also includes a system comprising a bushing for making fibers from molten glass, the bushing comprising at least one sidewall and an orifice plate having nozzles or tips protruding from the bottom surface, and cooling members mounted beneath and close to the bottom of the tips for providing cooling for the molten glass as it exits the tips, the orifice plate and the tips during fiberizing and hanging modes, the improvement comprising a nozzle or plurality of nozzles, supplied by a manifold connected to a source of cooling gas, on one end or at a center portion of the manifold, more typically attached to a cooling air source at each end of the nozzle or manifold.

In all embodiments of the invention the nozzle or manifold is located at least about 9 inches below, more typically at least about 10 inches and most typically between about 11 inches and 14 inches, such as about 12 inches below the level of the orifice or tip plate. Each manifold is spaced from opposite edges of the orifice or tip plate, out of the path of fibers, beads, and primary fibers coming from the bushing and any other cooling equipment located in the vicinity of the bushing. Each manifold is spaced from an edge, typically one of the longest edges of the orifice or tip plate a distance that is dependent upon the size of the orifice or tip plate, but the centerline of each manifold will be within a range of about 4 to about 10 inches from the centerline of the orifice or tip plate, more typically about 5 to about 8 inches and most typically within a range of about 6 to about 7 inches.

The invention also includes a system comprising a bushing for making fibers from molten glass, the bushing comprising at least one sidewall and an orifice plate having nozzles or tips protruding from the bottom surface, and cooling members mounted beneath and close to the bottom of the tips for providing cooling for the molten glass as it exits the tips, the orifice plate and the tips during fiberizing and hanging modes, the improvement comprising a nozzle or plurality of nozzles, supplied by a manifold connected to a source of cooling gas at each end of the nozzle or manifold, the nozzle or manifold being located at least 9 inches below the level of the orifice or tip plate, and out of the path of fibers, beads, and primary fibers coming from the bushing, and at least one actuator for moving the cooling members quickly from a fiberizing position in an upward direction to a hanging position and for moving the cooling members quickly back downwardly to a fiberizing position, a distance in the range of about 0.01 inch to about 0.2 inch and one or more foggers and/or misters laterally spaced from, and below, a side of the orifice plate of the bushing for causing a for and/or mist of cooling liquid to flow into a region immediately below the orifice plate.

The system comprises one or more bushings, each bushing having cooling members that are mounted beneath the orifice plate and tips of the bushing in a conventional manner or in the manner that permits the cooling members to be very quickly moved vertically at the action of the operator or an electrical activator that is activated by a sensor that responds to a breakout of the bushing or after the operator has noticed the bushing is breaking out or has broken out. By "breakout" is meant that the fibers being pulled into a product forming device like a chopper or winder have all broken and are no longer being pulled by these type of machines, and until primary fibers coming from that bushing are once again started into a product forming device, the bushing is said to be "hanging". The cooling members can be hollow tubes of any reasonable cross section, with or with out one or more fins, fins, hollow or solid, connected to a heat sink.

The cooling members are usually supported by one or more cross members, typically with a cross member outboard of and near each end of the bushing, that are supported with generally vertical members, each generally vertical member being capable of adjusting the distance from the top of the cross member to the bottom of the tips. By generally vertical is meant vertical and up to about 15 degrees from vertical. The cooling members are designed to carry a cooling liquid or other fluid. Air and water are fluids, but other gases and other liquids can be also used.

By mist is meant a plurality of small particles of liquid, typically water, about 40 to about 500 microns in diameter, suspended in air, and by fog is meant a plurality of small liquid particles, below about 40 microns in diameter, are suspended in air. Most typically the mist or fog liquid is water, process water, city water, more desirably rain water, distilled water or deionized water. The particles of liquid directed beneath the bushing can be either a fog, a mist, and more typically is a combination of fog and mist. A small percentage of particles can exceed 500 microns, no more than about 5-15 percent of the liquid weight, but typically these are avoided.

All of the above embodiments of the invention can, and often do also use one or more conventional air tubes mounted under the bushing for inducing air flows into the region beneath the bushing when the bushing is hanging.

Practice of the invention accomplishes much more than improving the performance of the bushing the invention is being used on. When all or most of the bushings on a melting furnace system are operated in the above manner, i.e. having substantially constant molten material throughput, the stability of the melting furnace, i.e. equilibrium, will be much improved, the quality, uniformity, of the molten glass reaching the bushings will be much improved, and the breakout rate of all the bushings will be substantially reduced. By "many of the bushings" is meant at least 25 percent of the operating bushings on the melting furnace system. The more bushings that are operated according to the invention on a melting furnace system, the more stable the melting furnace will become and the more improvement in break rate and cost. This will substantially increase the product productivity of the melting furnace system and substantially reduce the cost of every pound of fiber product produced according to the invention. Also, it is not necessary to replace or change the electrical power equipment used to control the bushing temperature, and because of the large number of bushings involved, thousands in the industry, this is a valuable factor.

The present invention is applicable to any system or bushing that converts molten material to continuous fibers and particularly to systems and bushings that operate at temperatures above 1000 degrees F. Materials suitable for converting in the present invention are polymers, metals and mineral materials including glasses, ceramic compounds or mixtures of ceramic materials, slags and the like. The invention is particularly useful in making continuous glass fibers and products made using such fibers. While the invention is applicable to any glass used to make fibers, E glass is the most common glass used to make continuous fiber.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION

Figure 1:
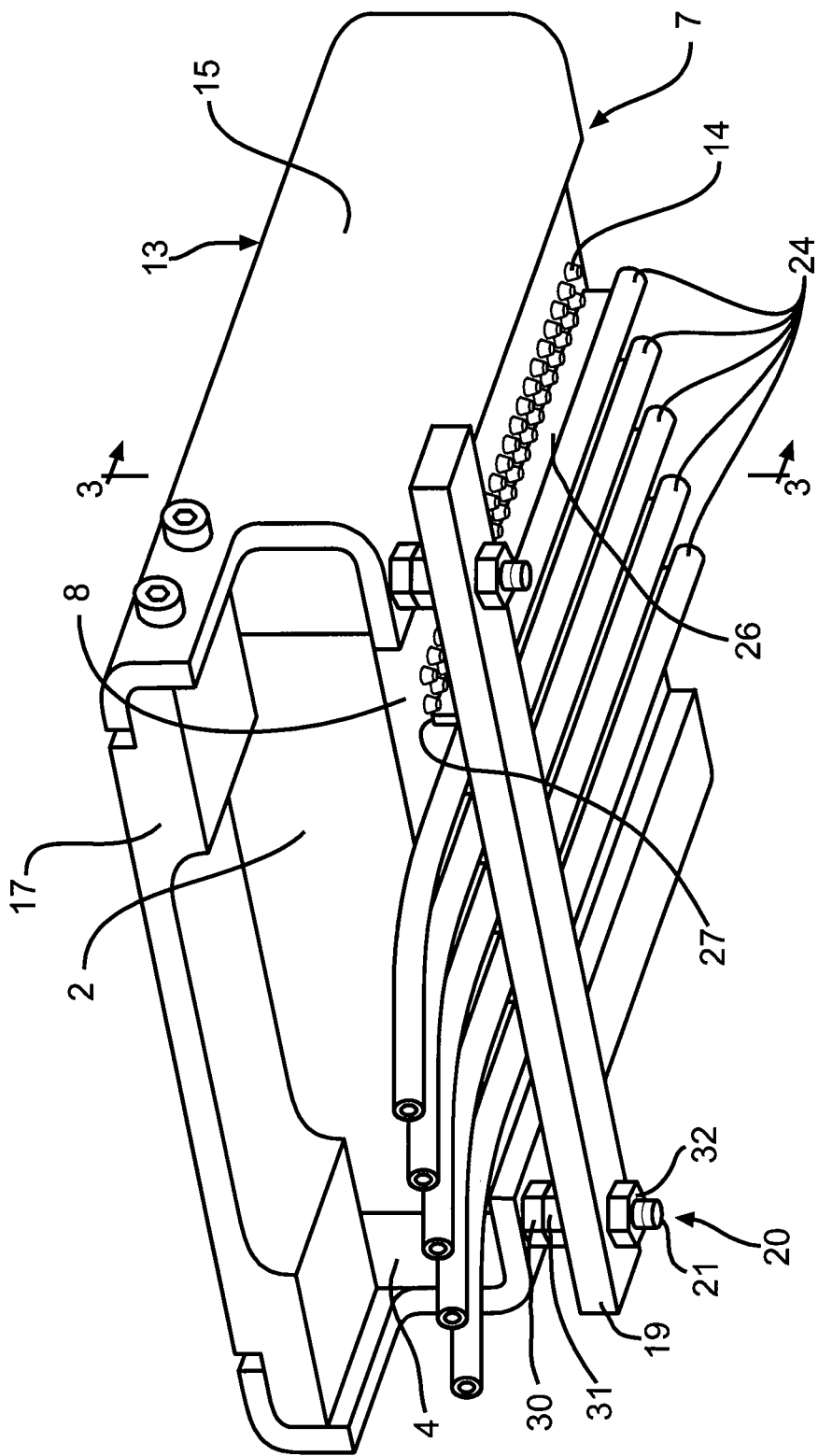
FIG. 1 is a cross section view of a typical prior art bushing assembly showing cooling members mounted beneath the bushing and an air tube for partially addressing a problem solved by the invention.

FIG. 1 is a partial perspective view of a typical mounted precious metal bushing assembly 7 including related hardware used to form glass fiber from molten glass. A bushing 2, typically made from a platinum/rhodium alloy having a rhodium content ranging from ten to about thirty percent, typically 20-22 percent is encompassed in a mount 13. The bushing 2 comprises conventional sidewalls, end walls in a known manner. The bushing 2 also comprises a tip plate 8 having a plurality of tips, nozzles, 14 welded to or formed from the tip plate 8. The tip plate 8, that can be just an orifice plate with out tips surrounding orifices in the orifice plate. The bushing 2 is electrically heated by connecting to an electrical input via a conventional terminal (not shown) on each end-wall, or sidewall, of the bushing 2 in a known manner. Only one end of the bushing is shown in FIG. 1 because the other end is identical except that the cooling tubes are not always bent, but extend straight to conventional cooling fluid, usually process water, supply hoses (not shown here).

The bushing 2 is contained in conventional refractory material 4 in a known mounting frame 13 that holds a top of the bushing 2 against a refractory surface around an orifice in the bottom of a forehearth of a furnace. The frame 13, typically made of stainless steel, comprises side rails 15 held in a spaced apart manner by a cross member 17 at each end of the side rails 15. Conventional insulating refractory castable 4 and refractory paper or felt is used between the bushing 2 and the mounting frame 13 in a known manner to provide electrical and thermal insulation for the bushing 2. Normally, the tips 14 are arranged in rows down the length of the bushing 2, but can be in rows running along the width of the bushing 2 as is known. In the bushing shown in FIG. 1, the tips 14 are arranged in pairs of rows staggered, running along the length of the bushing in a known manner, e.g. as shown in U.S. Pat. No. 4,337,075.

A space is left on the bottom of the orifice plate in between each double row of tips to allow cooling members such as cooling tubes 24, each having a heat removing fin 26 attached to their top surface. A tremendous amount of heat must be very quickly removed from the molten glass extruding from the tips 14 at temperature over 2000 degrees F.—and the cooling tubes 24 with their fins 26 perform this function, supplemented by a flow of air pulled into the area of the tips and fibers by the glass fibers moving rapidly downward, away from the tips 14. Although a cooling tube 14 was removed, in this figure, to better show the double row of tips 14, it is typical to use a cooling tube 24 having a single fin 26 in the positions just outside the outer row of tips 14 such that each row of tips is adjacent to a fin and cooling tube and adjacent to, but staggered with, another row of tips.

The cooling tubes 24 are supported in a known manner, such as disclosed in U.S. Pat. No. 5,244,483, its disclosure herein incorporated by reference, and by the method shown in FIG. 1. While the cooling tubes 24 shown here are oval in cross-section, they can be any reasonable shape such as round, square, rectangular with or without radiused ends, etc. as is known.

The cooling tubes 24 are supported at each end near each end of the bushing 2 with a crossbar 19 that is held, in an vertically adjustable manner, with a threaded rod 21 that is attached in any reasonable manner to the bottom surface of one of the side rails 15, typically by being threaded into the siderail 15 and secured from turning by a lock nut 30. An adjustable stop nut 31 is threaded onto each rod 21 such that the bottom surface of the stop nut 31 serves to position the top surface of the crossbar 19 and the bottom surface of the cooling tubes 24, hence also a top surface 27 if each cooling fin 26. The vertical distance between the top surface 27 of the cooling fins 26 and the bottom of the tips 14 is typically in a range of about 0-0.0625 inch.

FIG. 1 shows a portion of a mounted bushing 7 ready to be installed beneath a forehearth leg. Some of the cooling tubes 24 under the last double row of tips 14 have been left off of this figure to better show the tips 14 and the orifice plate 8. The bushing 2, because of its very hot and fairly fragile nature at operating temperature, is surrounded with insulation 4 in a known manner inside a stainless steel mounting frame 13 having side members 15 and cross members 17. The cooling tubes 24 are held in place near each end of the bushing 2 with a support bar 19 that can be adjusted vertically with corner vertical support assemblies 20. Each corner vertical support assembly 20 comprises a threaded rod 21, welded to, or screwed into threaded holes in, a lower portion of the side members 15, a lock nut 30 tightened against the bottom of the side member 15 to lock and support the threaded rod 21 in place, an adjustable stop nut 31 on the threaded rod 21 positioned at a desired level to locate a top 27 of the fins 26 at the desired position with respect to the tips 14 and the orifice plate 8, and a follower nut 32 to raise a top of the support bar 19 tightly against the adjustable stop nut 31 and to support the bottom of the cross member 19.

This arrangement permits the cooling tubes 24 to be raised or lowered as a group to optimize the cooling of each tip 14, each hot meniscus below each tip 14 and each fiber being drawn from each meniscus. This adjustment is slow because each corner vertical support 21 must be adjusted and each requires several minutes to adjust by sequentially running the follower nut 32 down each threaded rod 21 a desired amount and then rotating the stop nut 31 down to snug against the top of the cross member 19. In the prior art, the cooling tubes, fins or other cooling members remained in the adjusted position, keeping the distance between the tops 27 of the fins 26 and the bottom of the tips 14 the same, during both fiberizing and hanging conditions. A cooling fluid, like process water, runs through the cooling tubes 24 to provide cooling to the cooling tubes 24, with or without the fins 26.

Figure 2:
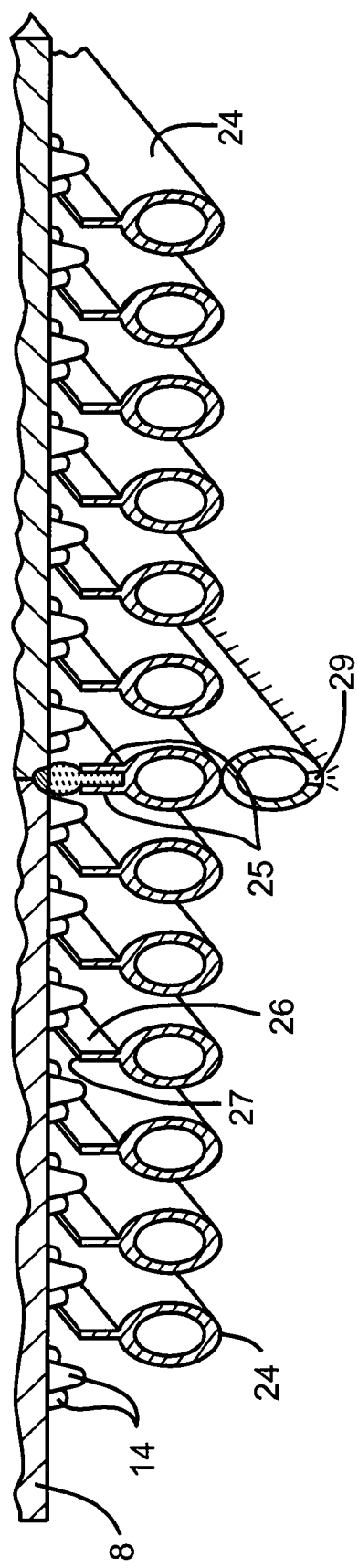
FIG. 2 is a partial cross sectional view of a bushing assembly showing conventional cooling tubes and a conventional air tube used to assist cooling of the orifice plate of the bushing.

FIG. 2 shows a prior art modification of FIG. 1 having one or more air tube 28, each having a slot or series of spaced apart holes 29 in the bottom of the air tube 28, mounted beneath one of the cooling members 24. When the bushing breaks out the air tube(s) is caused to emit a rapidly downward moving stream of air that creates a partial vacuum or low pressure zone in the area immediately beneath the tips 14. This partial vacuum then induces flows of air from the surroundings into the zone beneath the tips 14 and towards the air tube 28 or below the air tube 28 and finally downward with the primary fibers. Conventional air ducts 10 and 11 are mounted on each side of the bushings and direct refrigerated air towards the array of fibers in a conventional manner. The air ducts 10 and 11 can be of various dimensions and at various heights with respect to the bushing, and various distances from the bushings, as is well known.

Figure 3:
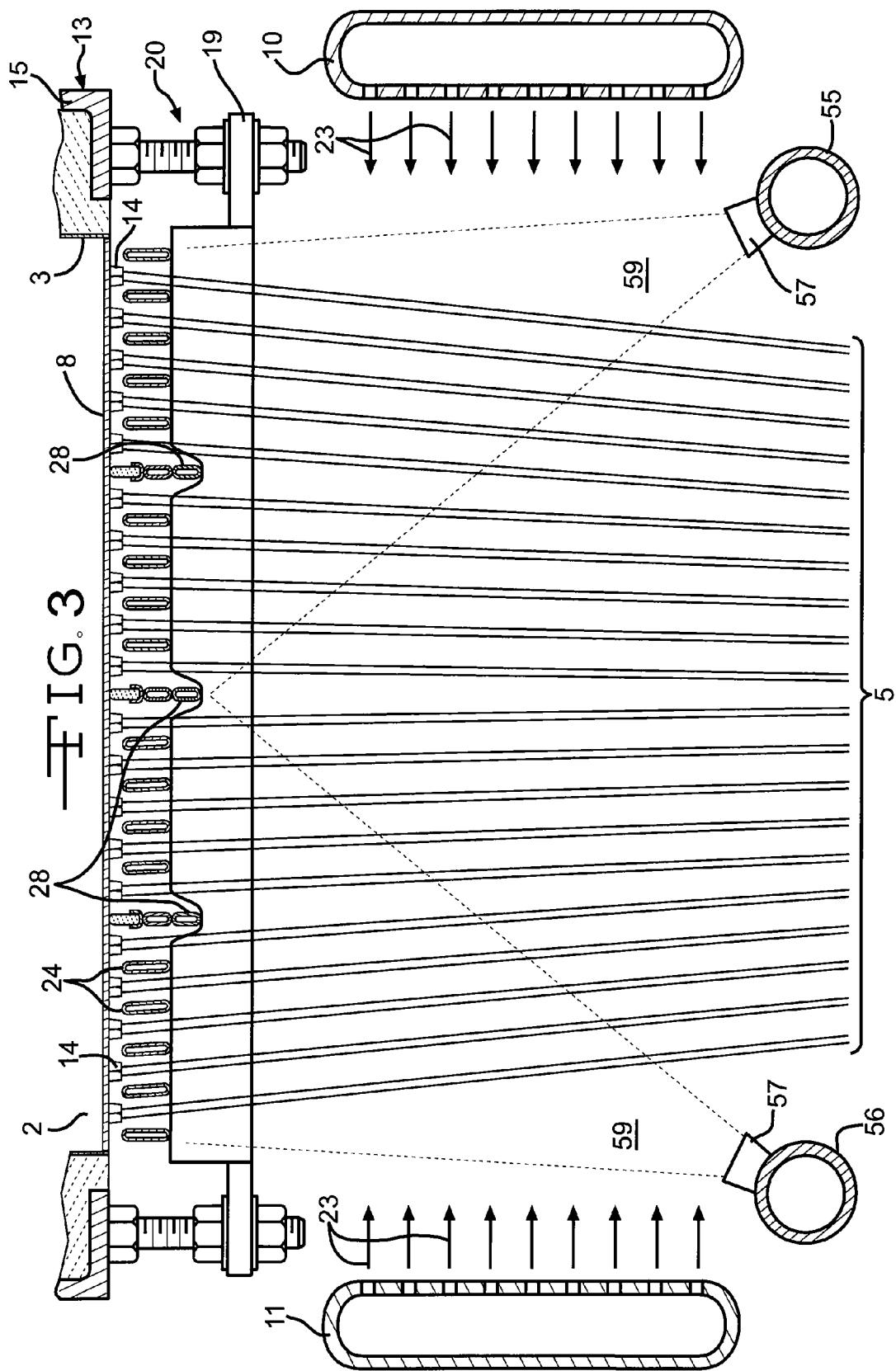
FIG. 3 is a cross section view of the prior art bushing assembly shown in FIG. 1 with a cooling fluid manifolds and a slot or spaced apart orifices or jets aimed towards the orifice or tip plate of the bushing in accordance with the invention.

FIG. 3 is a partial cross sectional view of an embodiment of the invention comprising the bushing 2 in the mounting frame 13 having side rails 15, the bushing having a side wall 3, an orifice plate 8 and nozzles, tips 14 and cooling members 24 with the cross bar support 19 and the vertical adjustable support assembly 20 like the bushing in FIG. 1. Air ducts 10,11 are conventional and direct a gentle flow 23 of cooling air into the forming room and the array of fibers 5 at all times, usually from both sides of the bushings 2. Located close to, but outside the path of the fiber array 5, beads and primary fiber and at least about 9 inches below the orifice or tip plate 8 of the bushing 2, and along both long edges of the bushing 2, are two manifolds 55,56 having a slot, or closely spaced nozzles, jets, or holes 57, located on the manifolds 55,56 in a position to direct one or more streams of cooling gas 59 upward towards the orifice or tip plate 8, each air flow 59 contacting at least 50 percent of the orifices or tips 14 on the orifice or tip plate 8. The temperature of the air flows 59, and their velocity and rate are controlled to achieve substantial constant bushing throughput as described above. In one embodiment, typical cooling fluid, such as air, pressure in each 0.5 inch inside diameter manifold 55,56 is about 2.5 psi and typical air flow rate from each manifold 55,56 is about 10.5 CFPM (cubic feet per minute) on a 6,000 tip bushing. The manifolds 55,56 were located about 12 inches below the tip plate 8 and about 6-7 inches, e.g. about 6.5 inches, from the centerline of the tip plate 8. A 6,000 tip bushing operated according to this embodiment showed a substantial decrease in break rate, i.e. breakouts per hour, compared with the same bushing operated without the manifolds 55,56 and air flows 59.

Figure 8:
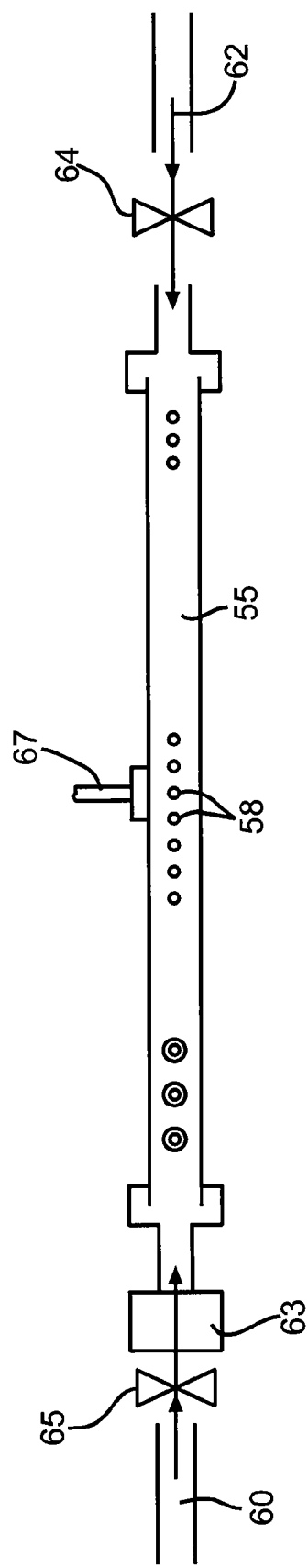
FIG. 8 is a front view of a cooling fluid manifold used in the invention and shows different embodiments of the invention.

FIG. 8 is a front view of the manifolds 55 with spaced apart jets or nozzles 57 or holes 58. A cooling gas is fed into each end of the manifold 55 with at least one of the supply pipes 60.62 by opening the on/off valves 64,65, one in each supply line. By feeding cooling fluid to both ends of the manifold 55,56, the magnitude and velocity of the cooling fluid flow 59 is more uniform along the length of the manifolds 55,56 and the orifice plate or tip plate 8 than if the cooling fluid is supplied from only one end. As an alternative, a single supply line can enter the manifold 55 at about its midpoint through an inlet 67. The cooling fluid is typically a gas and the gas is typically air, but any reasonable safe gas, or even a liquid mist or fog with or without air or a safe gas, can be used. When air is used it is typically compressed air within a temperature range of about 30-50 degrees F. to about 95 degrees F., and these temperatures would also be suitable for other gases. The pressure in the manifolds 55,56 is typically in the range of 1-10 psi, when valves 64,65 are open, more typically about 2-6 psi, and most typically about 2-4 psi, but actual pressure will depend upon the distance from the bushing, the size of the orifices, the temperature of the cooling fluid, and most importantly, the amount of cooling needed to maintain the molten material throughput of the bushing substantially constant. With the 6000 tip bushing discussed above, the holes 58 in the manifolds 55,56 had a diameter of about 0.047 inch and were spaced about 0.125 inch, but the diameter of the holes and the spacing can vary with the pressure in the manifold, the distance from the bushing, the type and size of bushing, and other variables affecting the cooling of the orifice plate or tip plate 8.

Figure 4:
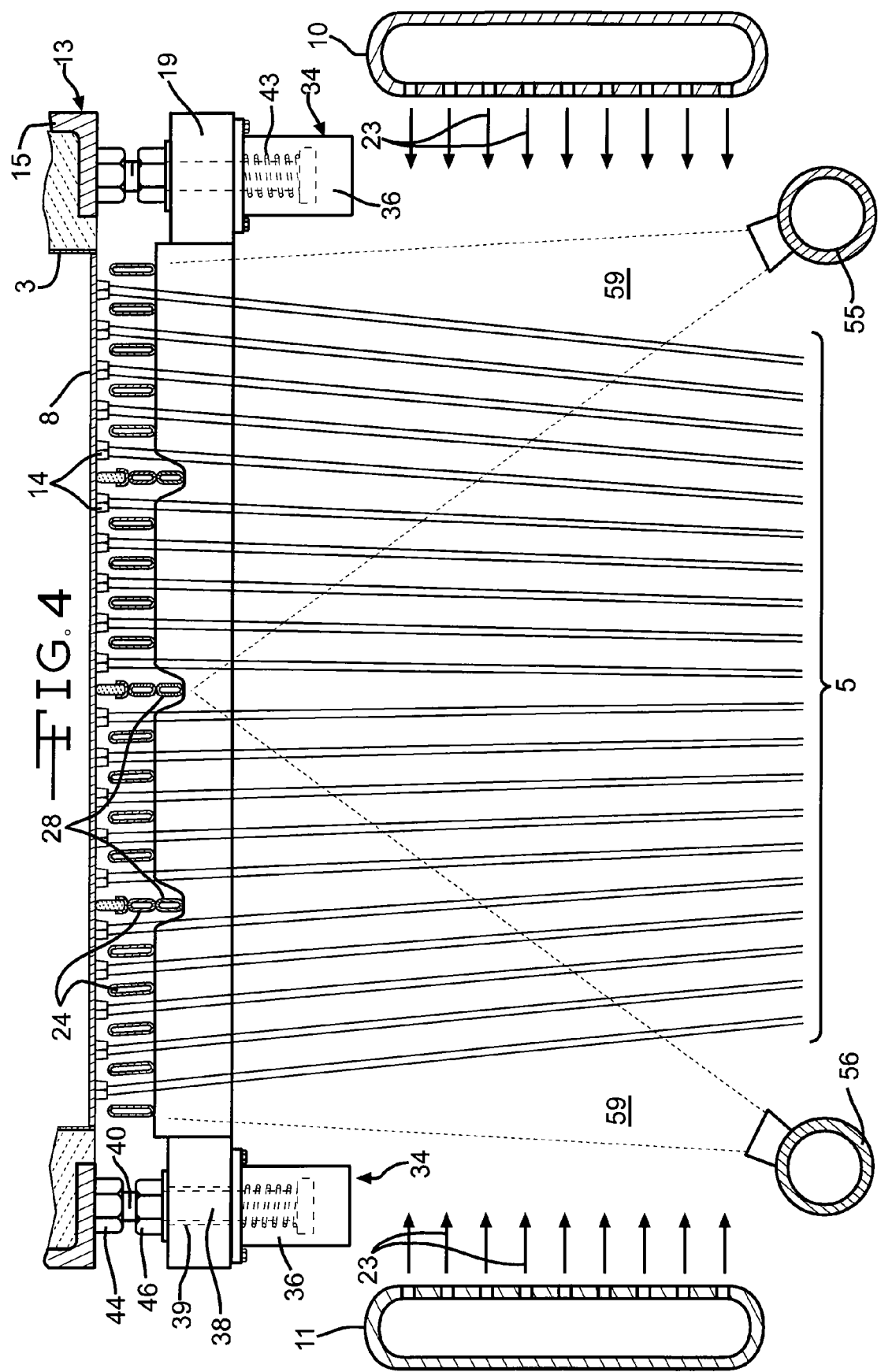
FIG. 4 is a partial cross sectional view of the embodiment shown in FIG. 3, further modified according to the invention so that the cooling members can be quickly moved vertically, the cooling member shown in a hanging mode.

FIG. 4 shows the mounted bushing of FIG. 3, but the cooling member hardware has been modified to produce another embodiment of the invention and to permit quick vertical adjustment of all the cooling tubes 24, typically as a group. In this embodiment everything is the same as in the assembly of FIG. 3 except that the vertical support assemblies 20 are replaced with a vertical actuator like an electrical solenoid assembly 34. The electrical solenoid assembly 34 comprises an electrical solenoid 36 attached to the cross member 19 in any suitable manner. The solenoid 36 has a shaft 38 that passes through an oversize hole 39 in the cross member 19 and comprises a threaded portion 40 above the cross member 19. The end of the shaft 38 is attached directly or indirectly to the side rail 15, such as being screwed into a threaded hole in the side rail 15 as shown in FIG. 3. A lock nut 44 tightened against the bottom of the side rail 15 secures the shaft 38 in the side rail 15. The shaft 38 can be attached to the side rail 15 in other ways such as by welding, press fit, or soldering, etc., or indirectly by being turned into a nut or other object, attached to the side rail 15, and having a threaded hole therein. An adjustable stop nut 46 on the threaded portion 40 of the shaft 38 fixes the maximum height that the cross member 15, and hence the tops 27 of the fins 26 on the cooling tubes 24 can reach. The adjustable stop nut 46, on each of the four solenoid assemblies 34, is adjusted to locate the tops 27 of the fins 26 with respect to the bottom surface of the orifice plate 8 and the bottoms of the tips 14 during the hanging mode of the bushing 2. FIG. 4 is shown in a hanging mode with the array of primary fibers 5 flowing downward.

Figure 5:
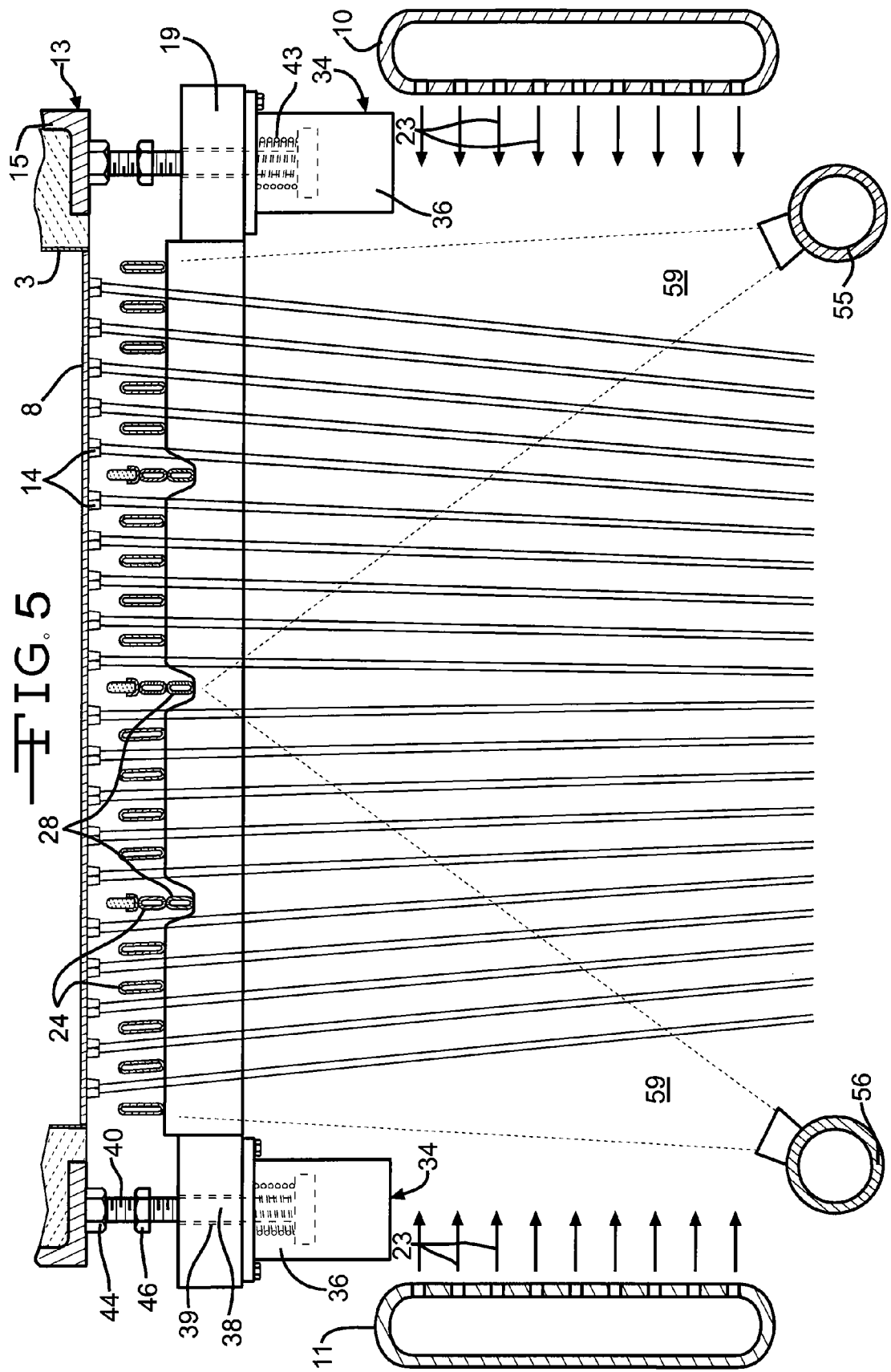
FIG. 5 is the partial cross sectional view shown in FIG. 4, but with the cooling members shown in a fiberizing mode.

FIG. 5 is the same embodiment shown in FIG. 4, but shown in the desirable fiberizing mode with the array of fibers 5 being desired fibers for the fiber product being produced. Note that the cooling members 24 have been moved away from the tips 14 by the solenoids 36. This movement is activated near the time that the primary fibers in FIG. 4 are put into a winder or chopper to start desired fiberization. By near the time is meant within 0-4 minutes, more typically within 1-4 minutes and most typically in less than 2 or 3 minutes on either side of the restart of desired fiberization. In the desired fiberizing position, the top of the fins 27 on the cooling members 24 are about +/−0.067 from the plane made by the bottom of the tips 14. The amount of movement of the top 27 of the cooling fins 26 between the operating position of FIG. 5 and the hanging position of FIG. 4 varies with the type and size of the bushing, the type of cooling members being used and the conditions surrounding the orifice plate 8 and the tips 14, but in the embodiment shown in FIGS. 2-5 the distance typically is in the range of about 0.01 or 0.03 inch to about 0.2 inch, more typically about 0.04 to about 0.45 and most typically about 0.06 to about 0.37. The movement of the cooling members is typically limited to less than about 0.2 inch and should never get so close to a tip 14 or the orifice plate or tip plate 8 so as to cause an electrical short.

Figure 6:
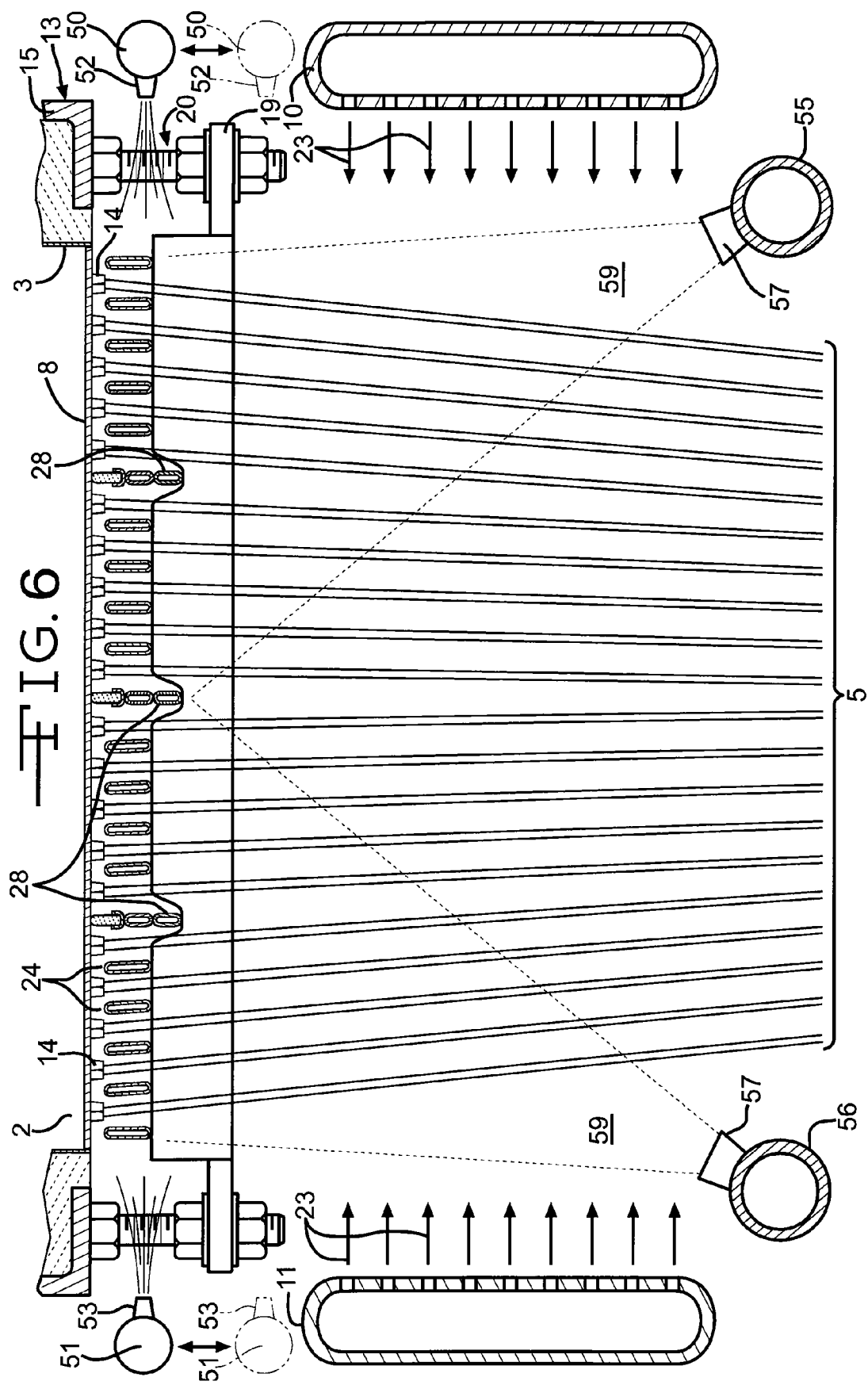
FIG. 6 is a partial cross sectional view of another embodiment like the embodiment shown in FIG. 3, but with additional cooling misters or foggers in place below the bushing.

FIG. 6, a cross section of a bushing assembly like to that shown in FIG. 3 and shows a different embodiment of the invention. In the bushing assembly of FIG. 6, commercially available fogging and/or misters 52 are located in a novel location, either connected to a manifold 50 as shown or spaced apart below the orifice plate 8 and tips 14 and spaced from the outside tips 14 of the bushing 2. It has been conventional to use water sprays, often called pad or pot sprays, located much below the orifice plate 8, to spray cooling water into the array of hot fibers to cool them sufficiently to prevent damage to the chemical sizing conventionally applied to the surface of the fibers still further from the orifice plate 8, but not to locate foggers and or misters close to the orifice plate 8 and the outside tips 14 down the sides, running along the length of the bushing 2, and to operate the foggers and/or misters 52 when the bushing is hanging. One or more conventional valves (not shown) in the water and/or compressed air line(s) supplying the misting and/or foggers 52, or the manifold 50, open to cause a fog or mist to be emitted into a region immediately below the tips 14, near the time when the bushing breaks out, to prevent the orifice plate 8 from overheating during the hanging mode, and then are closed near the time the bushing is put back into the fiberizing mode. By near the time is meant within a period of time ranging from 0.001 second to about 4 minutes and more typically the definition of this term provided above, from the time that the operator notices, or a sensor senses, that the bushing is breaking out, or from the time that the operator starts the strand into a product producing machine such as a winder or a chopper. The fog or mist entering the region immediately beneath, i.e from about 1 to about 12 inches, more typically from about 2 to about 10 inches, and most typically from about 2.5 inches to about 9 inches from the bottom of the tips 14.

Figure 7:
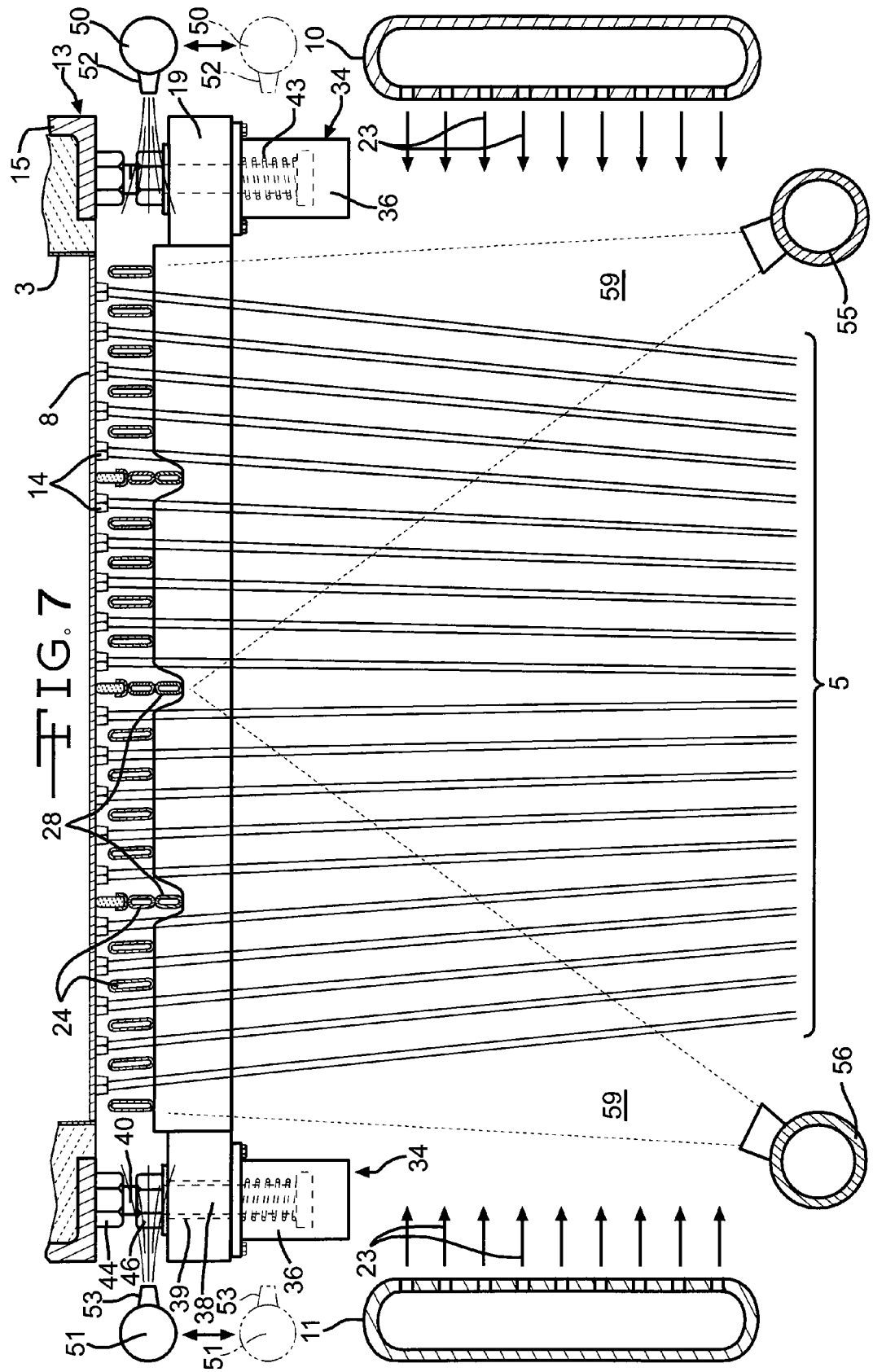
FIG. 7 is a partial cross sectional view of a still further embodiment like the embodiment shown in FIG. 5, but with additional cooling misters or foggers in place below the bushing, the cooling members shown in the hanging mode.

The invention also includes an embodiment that is includes a combination of the apparatus for cooling the orifice or tip plate 8 and the tips 14 that is disclosed in FIGS. 3-6 and such an embodiment is shown in FIG. 7. This type of embodiment, particularly when used with one or more air tubes 28, provides the maximum cooling of the tips 14 and orifice plate 8 during the hanging mode of the bushing. This combination of cooling apparatus enhances temperature stability and reduces break rate, breaks per day, on the larger bushings used in the industry, for example bushings having more than 4500 tips and can be needed at times or with different bushing assemblies having fewer than 4500 tips.

One can determine if additional cooling techniques are required while the bushing is hanging, in addition to blowing cooling air upward from substantially below, and outside the path of the array of fibers, beads, and primary fibers. One can do this by monitoring the amount of power being requested by the temperature control system for the bushing to maintain the desired temperature set point temperature in the orifice plate or tip plate, or other part of the bushing, or molten material above the orifice plate. If the power is varying more than about +/− one percent, or better yet more than about +/−0.5 percent, and even better yet more than about +/−0.25 percent, between the desired fiberization mode and the hanging mode, and it is impractical or ineffective to increase the rate of upward cooling air flow any further, then one or more additional cooling techniques described herein are appropriate. In some methods of the invention the rate of heat removal from the orifice plate is increased during hanging and decreased during fiberizing to maintain the electrical power load on the bushing as constant as practical. One can determine whether more or less cooling of the orifice plate 8 and tips 14 is needed on any given bushing assembly by monitoring the magnitude of power the automatic temperature controller for the bushing is applying to the bushing during the fiberizing mode and the hanging mode. The ideal is for this power magnitude to remain constant during both modes and during transition from one mode to another mode. One can add or remove additional cooling apparatus disclosed, move the cooling members closer or less close to the orifice plate 8 and/or tips 14, or increase or decrease the flow rate of the cooling liquid, like water, exiting the forgers and/or misters 52 shown in the embodiments of FIGS. 6 and 7 to improve the temperature uniformity of the molten material above the orifice plate 8 by monitoring the power load on the bushing and acting in the manner taught by this disclosure to keep the power requirements at as constant a level as possible.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A fiberizing system comprising a bushing for making fibers from molten glass, the bushing comprising at least one sidewall and a tip plate having nozzles or tips protruding from the bottom surface, and a plurality of metal cooling tubes mounted beneath and close to the tips on the tip plate for containing flowing cooling water and providing cooling for the molten glass as it exits the tips during both the fiberizing and hanging modes, the improvement comprising two sets of a plurality of nozzles, each set supplied by a manifold connected to one or more sources of cooling gas, each set of the plurality of nozzles being located at least about 11 inches below to about 24 inches below the bottom surface of the tip plate and on each side of the tip plate, the two sets providing two cooling air flows upward towards the tip plate, the two sets of a plurality of nozzles having centerlines within about 4 to 10 inches of a vertical extension of the centerline of the tip plate, but out of the path of fibers, beads, and primary fibers coming from the tip plate, an on/off valve being attached to each cooling air source for each manifold, a breakout sensor and a control system that opens each valve upon sensing a breakout and closes each valve near the time the sensor again signals a desired fiberization mode, the system being capable of keeping the throughput of molten glass during each hanging mode to remain within 97 to 103 percent of the throughput during the fiberization mode and of keeping the electric power to the bushing during the hanging mode to within +/−1 percent of the amount of electric power going to the bushing during the fiberization mode further comprising an actuator for moving the metal cooling tubes quickly from a fiberizing position in an upward direction to be closer to the tips, a hanging position, upon receiving a breakout signal from the breakout sensor and for quickly moving the cooling tube back downwardly to a fiberizing position near the time the sensor again signals a desired fiberization mode, a distance of movement in the range of about 0.01 inch to about 0.2 inch.

2. A fiberizing system comprising a bushing for making fibers from molten glass, the bushing comprising at least one sidewall and a tip plate having nozzles or tips protruding from the bottom surface, and a plurality of metal cooling tubes mounted beneath and close to the tips on the tip plate for containing flowing cooling water and providing cooling for the molten glass as it exits the tips during both the fiberizing and hanging modes, the improvement comprising two sets of a plurality of nozzles, each set supplied by a manifold connected to one or more sources of cooling gas, each set of the plurality of nozzles being located at least about 11 inches below to about 24 inches below the bottom surface of the tip plate and on each side of the tip plate, the two sets providing two cooling air flows upward towards the tip plate, the two sets of a plurality of nozzles having centerlines within about 4 to 10 inches of a vertical extension of the centerline of the tip plate, but out of the path of fibers, beads, and primary fibers coming from the tip plate, an on/off valve being attached to each cooling air source for each manifold, a breakout sensor and a control system that opens each valve upon sensing a breakout and closes each valve near the time the sensor again signals a desired fiberization mode, the system being capable of keeping the throughput of molten glass during each hanging mode to remain within 97 to 103 percent of the throughput during the fiberization mode and of keeping the electric power to the bushing during the hanging mode to within +/−1 percent of the amount of electric power going to the bushing during the fiberization mode, further comprising an actuator for moving the metal cooling tubes quickly from a fiberizing position in an upward direction to be closer to the tips, a hanging position, upon receiving a breakout signal from the breakout sensor and for quickly moving the cooling tube back downwardly to a fiberizing position near the time the sensor again signals a desired fiberization mode, a distance of movement in the range of about 0.01 inch to about 0.2 inch wherein the actuator is an electrical solenoid.

3. A fiberizing system comprising a bushing for making fibers from molten glass, the bushing comprising at least one sidewall and a tip plate having nozzles or tips protruding from the bottom surface, and a plurality of metal cooling tubes mounted beneath and close to the tips on the tip plate for containing flowing cooling water and providing cooling for the molten glass as it exits the tips during both the fiberizing and hanging modes, the improvement comprising two sets of a plurality of nozzles, each set supplied by a manifold connected to one or more sources of cooling gas, each set of the plurality of nozzles being located at least about 11 inches below to about 24 inches below the bottom surface of the tip plate and on each side of the tip plate, the two sets providing two cooling air flows upward towards the tip plate, the two sets of a plurality of nozzles having centerlines within about 4 to 10 inches of a vertical extension of the centerline of the tip plate, but out of the path of fibers, beads, and primary fibers coming from the tip plate, an on/off valve being attached to each cooling air source for each manifold, a breakout sensor and a control system that opens each valve upon sensing a breakout and closes each valve near the time the sensor again signals a desired fiberization mode, the system being capable of keeping the throughput of molten glass during each hanging mode to remain within 97 to 103 percent of the throughput during the fiberization mode and of keeping the electric power to the bushing during the hanging mode to within +/−1 percent of the amount of electric power going to the bushing during the fiberization mode, further comprising an actuator for moving the metal cooling tubes quickly from a fiberizing position in an upward direction to be closer to the tips, a hanging position, upon receiving a breakout signal from the breakout sensor and for quickly moving the cooling tube back downwardly to a fiberizing position near the time the sensor again signals a desired fiberization mode, a distance of movement in the range of about 0.01 inch to about 0.2 inch wherein the actuator is capable of moving the cooling tubes from one mode of operation to another mode of operation within 15 seconds.

4. A fiberizing system comprising a bushing for making fibers from molten glass, the bushing comprising at least one sidewall and a tip plate having nozzles or tips protruding from the bottom surface, and a plurality of metal cooling tubes mounted beneath and close to the tips on the tip plate for containing flowing cooling water and providing cooling for the molten glass as it exits the tips during both the fiberizing and hanging modes, the improvement comprising two sets of a plurality of nozzles, each set supplied by a manifold connected to one or more sources of cooling gas, each set of the plurality of nozzles being located at least about 11 inches below to about 24 inches below the bottom surface of the tip plate and on each side of the tip plate, the two sets providing two cooling air flows upward towards the tip plate, the two sets of a plurality of nozzles having centerlines within about 4 to 10 inches of a vertical extension of the centerline of the tip plate, but out of the path of fibers, beads, and primary fibers coming from the tip plate, an on/off valve being attached to each cooling air source for each manifold, a breakout sensor and a control system that opens each valve upon sensing a breakout and closes each valve near the time the sensor again signals a desired fiberization mode, the system being capable of keeping the throughput of molten glass during each hanging mode to remain within 97 to 103 percent of the throughput during the fiberization mode and of keeping the electric power to the bushing during the hanging mode to within +/−1 percent of the amount of electric power going to the bushing during the fiberization mode, further comprising an actuator for moving the metal cooling tubes quickly from a fiberizing position in an upward direction to be closer to the tips, a hanging position, upon receiving a breakout signal from the breakout sensor and for quickly moving the cooling tube back downwardly to a fiberizing position near the time the sensor again signals a desired fiberization mode, a distance of movement in the range of about 0.01 inch to about 0.2 inch wherein the assembly further comprises one or more misters and/or foggers laterally spaced from, and below, the tips of the bushing for causing a fog and/or mist of particles of cooling liquid, most of fog or mist particles being smaller than 500 microns with no more than 15 wt. percent of the liquid particles to be larger than 500 microns, to flow into a region ranging from about 2 to about 9 inches below the bottom of the tips, and one or more valves for activating the one or more misters and/or foggers, the valves being activated by the sensor that detects a breakout and a fiberization mode.

* * * * *